United States Patent [19]
Ido

[11] Patent Number: 6,044,053
[45] Date of Patent: Mar. 28, 2000

[54] DC-BALANCE-VALUE CALCULATION CIRCUIT AND RECORDING SIGNAL GENERATOR USING THE SAME

[75] Inventor: Yasuo Ido, Kanagawa, Japan

[73] Assignee: Sony Corporation, Tokyo, Japan

[21] Appl. No.: 08/985,708

[22] Filed: Dec. 5, 1997

[30] Foreign Application Priority Data

Dec. 10, 1996 [JP] Japan ................................. 8-330012

[51] Int. Cl.[7] ....................................................... G11B 7/00
[52] U.S. Cl. ................................................. 369/59; 341/58
[58] Field of Search .......................... 369/59, 47; 360/40; 341/58, 95, 59; 377/2, 29

[56] References Cited

U.S. PATENT DOCUMENTS

| 4,499,454 | 2/1985 | Shimada | 369/59 |
| 5,371,771 | 12/1994 | Kim | 341/58 |

*Primary Examiner*—Thang V. Tran
*Attorney, Agent, or Firm*—Frommer Lawrence & Haug, LLP.; William S. Frommer

[57] ABSTRACT

A dc balance-value calculation circuit is used in a recording signal generator for performing the block coding of original data to generate a code word having a series of at least two non-inverted bits and generating a recording signal based on the code word. The dc balance-value calculation circuit calculates a dc balance value representing a shift in the dc balance of the recording signal. The dc balance-value calculation circuit includes: selection means for separating the code word generated by the block coding into unit data of a plurality of bits, and selectively outputting the unit data; determination means for determining a change in a dc balance value for each unit data, based on the unit data output by the selection means; and dc-balance-value calculation means for calculating a dc balance value in accordance with the determination result by the determination means.

2 Claims, 6 Drawing Sheets

| DC BITS (m) | SIGN (n:m-1) | UP | DOWN | SIGN(n:m) |
|---|---|---|---|---|
| 00 | 0 | 1 | 0 | 0 |
| 00 | 1 | 0 | 1 | 1 |
| 01 | 0 | 0 | 0 | 1 |
| 01 | 1 | 0 | 0 | 0 |
| 10 | 0 | 0 | 1 | 1 |
| 10 | 1 | 1 | 0 | 0 |

| CODE BITS (m) | SIGN (n:m-1) | 2 UP | 1 UP | 2 DOWN | 1 DOWN | SIGN (n:m) |
|---|---|---|---|---|---|---|
| 0000 | 0 | 1 | 0 | 0 | 0 | 0 |
| 0000 | 1 | 0 | 0 | 1 | 0 | 1 |
| 0001 | 0 | 0 | 1 | 0 | 0 | 1 |
| 0001 | 1 | 0 | 0 | 0 | 1 | 0 |
| 0010 | 0 | 0 | 0 | 0 | 0 | 1 |
| 0010 | 1 | 0 | 0 | 0 | 0 | 0 |
| 0100 | 0 | 0 | 0 | 0 | 1 | 1 |
| 0100 | 1 | 0 | 1 | 0 | 0 | 0 |
| 1000 | 0 | 0 | 0 | 1 | 0 | 1 |
| 1000 | 1 | 1 | 0 | 0 | 0 | 0 |
| 1001 | 0 | 0 | 0 | 0 | 1 | 0 |
| 1001 | 1 | 0 | 1 | 0 | 0 | 1 |

| DATA · SYMBOLS | CODE WORDS |
|---|---|
| 10000000 | 0010000100100100 |
| 10000001 | 0000100010001000 |
| 10000010 | 0010000100000100 |
| 10000011 | 0001000000100000 |
| ⋮ | ⋮ |

DC-BALANCE-VALUE CALCULATION CIRCUIT AND RECORDING SIGNAL GENERATOR USING THE SAME

BACKGROUND OF THE INVENTION

1. Field of the Invention

The present invention relates to a dc balance-value calculation circuit, used in a recording signal generator for performing the block coding of original data to generate a code word and generating a recording signal based on the code word, provided for calculating a dc balance value representing a shift in the dc balance of the recording signal.

2. Description of the Related Art

When digital data "1" or "0" in the form of the presence or absence of a bit is recorded on a recording medium such as an optical disc, an interval with "0", namely, an interval during which no bit is recorded may be generated for a long period, which is disadvantageous to reproduction of a clock and so forth. Accordingly, conventional modulation called "block coding" is used in which original data is separated into a plurality of data composed of x bits (where x is an integer equal to 2 or greater), and each data of x bits is converted into data composed of y bits (where y≧x). For example, digital video discs (DVDs) employ eight-to-sixteen modulation in which original data is separated into a plurality of data composed of eight bits, and each eight-bit data is correlated with the corresponding sixteen-bit data. In the block coding, x-bit data to be coded is called a "data symbol", while y-bit coded data is called a "code word".

Figure 5:
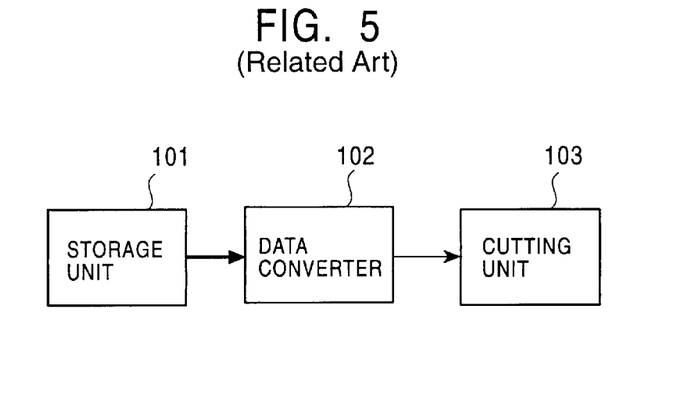
FIG. 5 is a block diagram showing an embodiment of a DVD master disc production system for producing a DVD master disc.

FIG. 5 shows a block diagram of a DVD master disc production system. This DVD master disc production system includes a storage unit 101 for reproducing and holding original data, a data converter 102 as a recording signal generator for converting the data reproduced by the storage unit 101 into a recording signal to be recorded on a master disc, and a cutting unit 103 for cutting the master disc in accordance with an output signal from the data converter 102. The storage unit 101 reproduces the original data from an original data-recorded storage medium produced in a studio or the like, such as a tape. A tape streamer, a hard disc drive or the like is used as the storage unit 101. The data converter 102 performs processes such as adding an error correction code to the data reproduced by the storage unit 101, and converts the data into the recording signal to be recorded on the master disc by using the eight-to-sixteen modulation.

Figure 6:
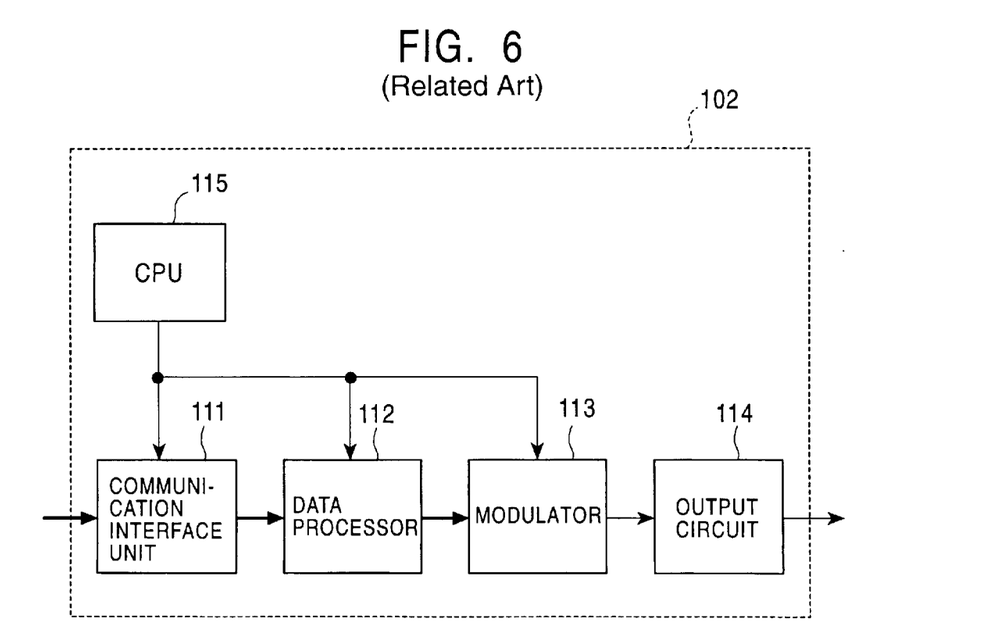
FIG. 6 is a block diagram showing a data converter in the DVD master disc production system shown in FIG. 5.

FIG. 6 shows a block diagram of the data converter 102 shown in FIG. 5. The data converter 102 includes a communication interface unit 111 for inputting the data from the storage unit 101 to the data converter 102, a data processor 112 for performing processes such as adding the error correction code to the data input by the communication interface unit 111, a modulator 113 including an eight-to-sixteen modulation circuit for performing the eight-to-sixteen modulation of output data from the data processor 112, an output circuit 114 for generating a recording signal based on output data from the modulator 113 and outputting the recording signal, and a central processing unit (CPU) 115 for controlling the communication interface unit 111, the data processor 112 and the modulator 113.

In the data converter 102, the data from the storage unit 101 is input by the communication interface unit 111 to the data processor 112 which performs processes such as adding the error correction code to the input data, and the eight-to-sixteen modulation of the data from the data processor 112 is performed by the modulator 113. The output circuit 114 generates the recording signal, based on the data modulated by the modulator 113, and outputs it to the cutting unit 103 shown in FIG. 5. The CPU 115 controls the communication interface unit 111, the data processor 112 and the modulator 113 so that the recording signal to be recorded on the master disc by the cutting unit 103 is continuously output by the output circuit 114.

Figure 7:
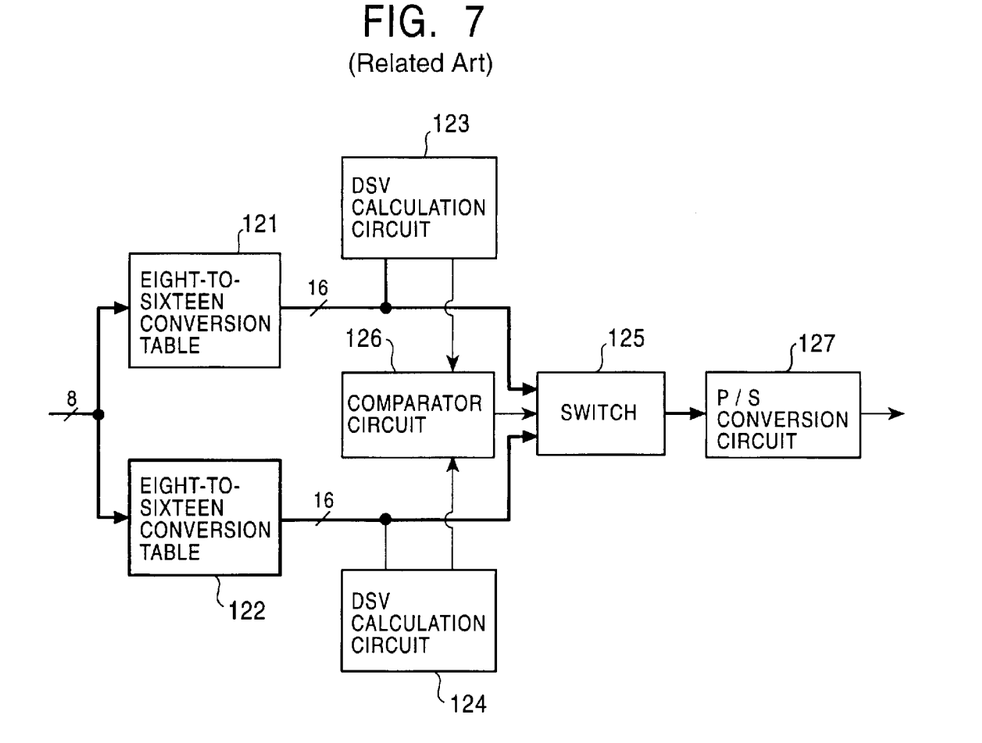
FIG. 7 is a block diagram showing an eight-to-sixteen modulation circuit in a modulator shown in FIG. 6.

FIG. 7 shows a block diagram of the eight-to-sixteen modulation circuit in the modulator 113 shown in FIG. 6. Although the eight-to-sixteen modulation circuit is actually complicated, it is simplified in FIG. 7 unless the simplification affects the description of the present invention. The eight-to-sixteen modulation circuit includes two eight-to-sixteen conversion tables 121 and 122 for respectively converting an input 8-bit data symbol into a 16-bit code word, a digital-sum-value/digital-sum-variation (DSV) calculation circuit 123 for calculating a dc balance value (hereinafter referred to as a "DSV") representing a shift in the dc balance of the recording signal, based on a code word output from the eight-to-sixteen conversion table 121, a DSV calculation circuit 124 for calculating a DSV, based on a code word output from the eight-to-sixteen conversion table 122, a switch 125 for selecting either of the code words output from the eight-to-sixteen conversion tables 121 and 122 before outputting the selected code word, a comparator circuit 126 for controlling the switch 125 so that either code word having a smaller absolute value is selected by comparing the calculations obtained by the DSV calculation circuits 123 and 124, and a parallel-to-serial (P/S) conversion circuit 127 for performing the P/S conversion of the code word output from the switch 125 before outputting it. The eight-to-sixteen conversion table 121 or 122 is realized by, e.g., a read only memory (ROM).

Figure 8:
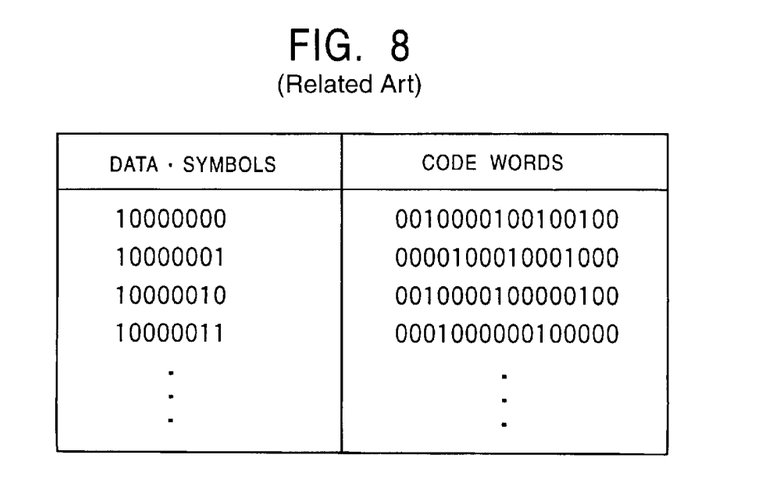
FIG. 8 is a table showing the contents of an eight-to-sixteen conversion table in the eight-to-sixteen modulation circuit shown in FIG. 7.

FIG. 8 shows an example of the contents of the eight-to-sixteen conversion table 121 or 122. The eight-to-sixteen modulation must have the condition that, between consecutive inverted bits "1" and "1", there are inserted at least two non-inverted bits "0", in other words, there is a series of at least two non-inverted bits "0". The contents of the eight-to-sixteen conversion table 121 or 122 are prepared accordingly.

Here the DSV will be described. By letting the condition of the recording signal waveform when it is at high level and the condition of it when it is at low level represent +1 and −1, respectively, the DSV is the total of these values. Accordingly, the DSV represents a shift in the dc balance of the recording signal, which influences a servocircuit in a unit for reproducing a signal from a disc. Thus, preferably, the absolute value of the DSV is as small as possible.

Figure 9:
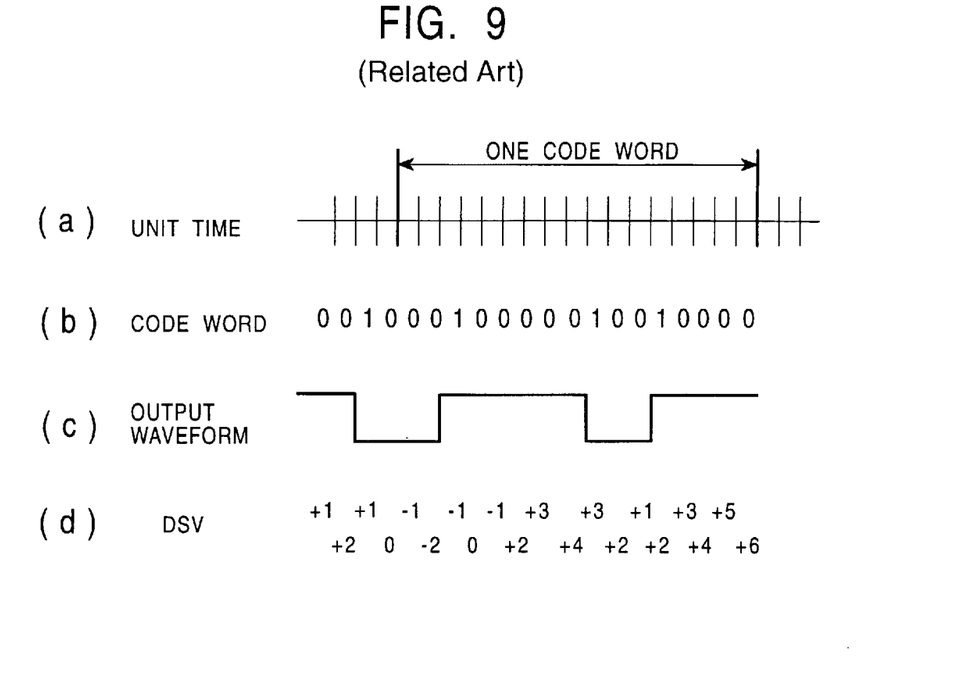
FIG. 9 is a chart showing a relationship established by a code word, an output waveform and a DSV in eight-to-sixteen modulation.

FIG. 9 shows a relationship established by the code word in the eight-to-sixteen modulation, the output waveform (recording signal) from the output circuit 114 corresponding to the code word, and DSVs. FIG. 9(a) shows time separations in units of one bit and a code-word unit of sixteen bits. FIG. 9(b) shows an example of the code word. FIG. 9(c) shows the output waveform corresponding to the code word shown in FIG. 9(b). The output waveform is inverted when "1" appears in the code word. This example assumes that the end of the pattern of the last code word was at low level. FIG. 9(d) shows the DSVs corresponding to the code word shown in FIG. 9(b). This case assumes that the DSV at the end of the pattern of the last code word was "0".

The two eight-to-sixteen conversion tables 121 and 122 shown in FIG. 7 are used to select the code word so that the absolute value of the DSV is minimum. Therefore, in the two eight-to-sixteen conversion tables 121 and 122, mutually different code words are defined for at least some of the data symbols.

In the eight-to-sixteen modulation circuit shown in FIG. 7, the eight-to-sixteen conversion tables 121 and 122 convert input 8-bit data symbols into 16-bit code words, and the code words are input to the switch 125. The DSV calculation circuits 123 and 124 calculate DSVs, based on the code words output from the eight-to-sixteen conversion tables 121 and 122. The comparator circuit 126 compares the calculations obtained by the DSV calculation circuits 123 and 124. The switch 125 is controlled so that the DSV having a smaller absolute value is selected. When the absolute values of the DSVs obtained by the DSV calculation circuits 123 and 124 are equal, the comparator circuit 126 controls the switch 125 to select either predetermined output or either output having been selected from the outputs of the eight-to-sixteen conversion tables 121 and 122. The code word output from the switch 125 is converted from the parallel to the serial form by the P/S conversion circuit 126, and is output as serial data. In the above manner the eight-to-sixteen modulation circuit shown in FIG. 7 performs the eight-to-sixteen conversion so that the absolute value of the DSV is least.

Next, referring to a method for calculating a DSV, calculation of a DSV based on a new code word requires the former DSV and information on whether the former output waveform was at high level or low level. The information on whether the former output waveform was at high level or low level is needed to determine whether the new word heading when it is "0" is changed to +1 or −1. Here, by letting the DSV change determined by only the n-th code word be ΔDSV'(n), and Sign representing whether the former waveform is at high level or low level be Sign(n−1), the DSV(n) which is the DSV at the termination of the n-th code word is expressed by the following equation:

$$DSV(n)=DSV(n-1)+(\text{Sign}(n-1))\cdot(\Delta DSV'(n))$$

Concerning the maximum DSV, the maximum DSV is controlled by the algorithm of the eight-to-sixteen modulation so as to be equal to ±1024 or less. Thus, in order to realize the DSV calculation circuit by hardware, twelve bits are needed including sign bits. An example of the DSV calculation circuit enabling DSV calculation by hardware is shown in FIG. 10.

Figure 10:
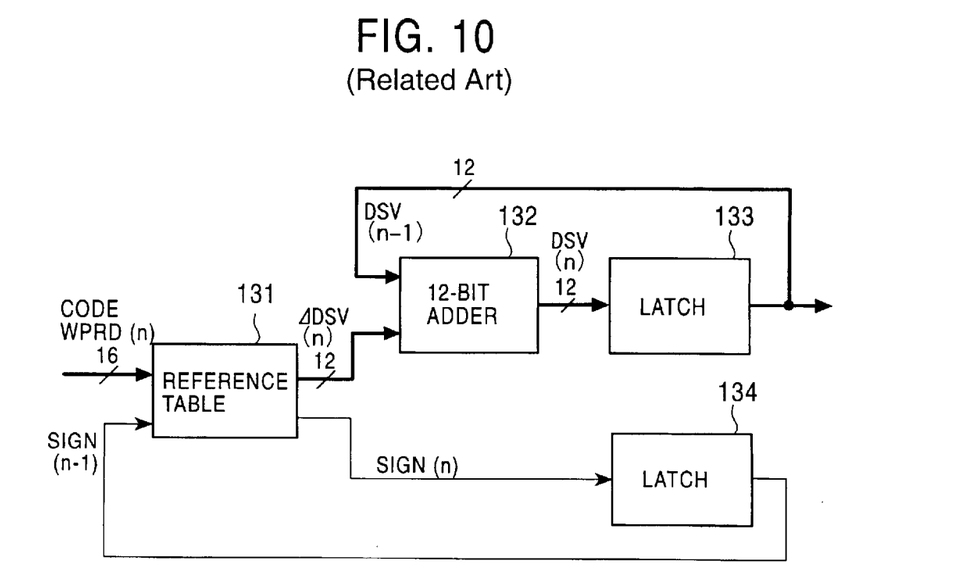
FIG. 10 is a block diagram showing an example of a DSV calculation circuit.

The DSV calculation circuit shown in FIG. 10 includes a reference table 131 to which the input n-th Code Word(n), and Sign(n−1) determined by the (n−1l)-th code word are input and which outputs a DSV change ΔDSV(n) caused by the n-th code word obtained in consideration of Sign(n−1) determined by the (n−1)-th code word, and Sign(n) determined by the n-th code word, where ΔDSV(n) is a value corresponding to (Sign(n−1)) in the above equation. The DSV calculation circuit shown in FIG. 10 also includes: a 12-bit adder 132 for calculating DSV(n) as the DSV at the termination of the n-th code word by adding DSV(n−1) as the DSV at the termination of the (n−1)-th code word and ΔDSV(n); a latch 133 for holding and outputting the output DSV(n) of the 12-bit adder 132, and supplying it to the 12-bit adder 132 when the subsequent DSV is calculated; and a latch 134 for holding Sign(n) output from the reference table 131, and supplying it to the reference table 131 when the subsequent DSV is calculated.

In the DSV calculation circuit shown in FIG. 10, the input n-th Code Word(n), and the former Sign(n−1) output from the latch 134 are input to the reference table 131, and they are converted by the reference table 134 into the DSV change ΔDSV(n) (with a 12-bit code) caused by the n-th code word and Sign(n) for the next. ΔDSV(n) is added to DSV(n−1) as the last DSV by the 12-bit adder 132, and the result is held by the latch 133. The output of the latch 133 is a DSV to be sought. In addition, Sign(n) is also held by the latch 134 for the next, and is supplied to the reference table 131.

According to the DSV calculation circuit shown in FIG. 10, the reference table 131 is large as it has inputs of seventeen bits and outputs of thirteen bits, and the adder 132 has twelve bits. Thus, the size of the whole DSV calculation circuit is disadvantageously large.

Figure 11:
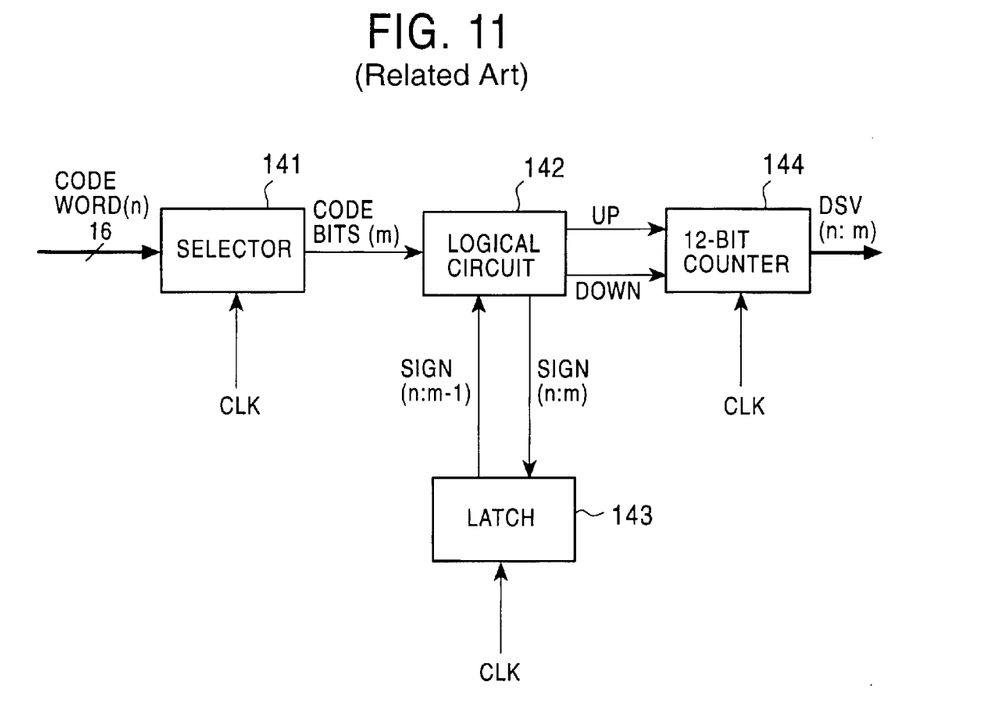
FIG. 11 is a block diagram showing another example of the DSV calculation circuit.

Next, a DSV calculation circuit for calculating the DSV for each bit of a code word by using a counter without using an adder will be mentioned. An example of the DSV calculation circuit is shown in FIG. 11. The DSV calculation circuit includes a selector 141 for sequentially outputting the input n-th Code Word(n) bit by bit from its head in the form of code bits(m) in accordance with a clock clk (where m represents the bit order from the head). The condition of each bit in the code bits(m) when it is "1" means the inversion of an output waveform, and the condition of it when it is "0" means the non-inversion of the output waveform. The DSV calculation circuit shown in FIG. 11 includes: a logical circuit 142 for carrying out a logical operation with the code bits(m) output from the selector 141, the last code bits(m−1), and Sign(n:m) representing whether the last code bits(m) are at high level or low level, whereby outputting a count-up signal "Up", a countdown signal "Down" and Sign(n:m) of the code bits(m); a latch 143 operating in accordance with the clock clk for holding Sign(n:m) output from the logical circuit 142, and supplying it to the logical circuit 142 when the subsequent code bits(m+1) are input; and a 12-bit counter 144 operating in accordance with the clock clk for counting up when the count-up signal Up is "1" and counting down when the countdown signal Down is "1", whereby outputting DSV (n:m) as the DSV of the code bits(m) for the n-th code word.

In the DSV calculation circuit shown in FIG. 11, the input n-th Code Word(n) is sequentially output bit by bit from its head in the form of the code bits(m) in accordance with the clock clk by the selector 141, and the output is input to the logical circuit 142. The logical circuit 142 outputs the count-up signal Up, the count-down signal Down and Sign (n:m) by carrying out a logical operation with the code bits(m) output from the selector 141 and Sign(n:m−1). The Sign(n:m) output from the logical circuit 142 is held by the latch 143, and is supplied to the logical circuit 142 when the subsequent code bits(m+1) are input. The count-up signal Up and the count-down signal Down are input to the 12-bit counter 144. The 12-bit counter 144 operating in accordance with the clock clk outputs DSV(n:m) as the DSV for the code bits(m) from the n-th code word by counting up when the count-up signal Up is "1", and counting down when the count-down signal Down is "1". Although the DSV calculation circuit shown in FIG. 11 is smaller in size than the DSV calculation circuit shown in FIG. 10, it needs a long period of sixteen clocks for DSV calculation for one code word. Accordingly, an eight-to-sixteen modulation circuit as shown in FIG. 7 disadvantageously reduces the time for processing based on a DSV calculation by the comparator 126.

SUMMARY OF THE INVENTION

The present invention has been made in view of the foregoing problems. Accordingly, it is an object of the present invention is to provide a dc-balance-value calculation circuit, used in a recording signal generator for performing the block coding of original data to generate a code word and generating a recording signal based on the code word, provided for calculating a shift in the dc balance of the recording signal. The dc-balance-value calculation circuit enables a reduction in the circuit size and high-speed calculation.

To this end, according to an aspect of the present invention, the foregoing object has been achieved through provision of a dc balance-value calculation circuit, used in a recording signal generator for performing the block coding of original data to generate a code word having a series of at least two non-inverted bits and generating a recording signal based on the code word, provided for calculating a dc balance value representing a shift in the dc balance of the recording signal, in which the dc balance-value calculation circuit includes: selection means for separating the code word generated by the block coding into unit data of a plurality of bits, and selectively outputting the unit data; determination means for determining a change in a dc balance value for each unit data, based on the unit data output by the selection means; and dc-balance-value calculation means for calculating a dc balance value in accordance with the determination result by the determination means.

Preferably, the determination means includes a logical circuit for outputting a signal representing the change in the dc balance value by carrying out a logical operation based on the unit data output by the selection means, and the condition of the recording signal at the termination of previous unit data.

The dc-balance-value calculation means may include a counter for performing a count operation in accordance with the signal output by the logical circuit.

According to another aspect of the present invention, the foregoing object has been achieved through provision of a recording signal generator including: block coding means for performing the block coding of original data to generate a code word having a series of at least two non-inverted bits; dc-balance-value calculation means for calculating a dc balance value representing a shift in the dc balance of the block-coded data; and generating means for generating a recording signal based on the block-coded data, in which the dc-balance-value calculation means includes: selection means for separating the code word obtained by the block coding means into a plurality of unit data composed of a plurality of bits and selectively outputting the unit data; determination means for determining a change in a dc balance value for each unit data, based on the unit data output by the selection means; and dc-balance-value calculation means for calculating a dc balance value in accordance with the determination result by the determination means.

Preferably, dc-balance-value calculation means includes a counter for performing a count operation in accordance with the signal output by the logical circuit.

The dc-balance-value calculation means may include a counter for performing a count operation in accordance with the signal output by the logical circuit.

DESCRIPTION OF THE PREFERRED EMBODIMENTS

Embodiments of the present invention will be described below with reference to the attached drawings.

Figure 1:
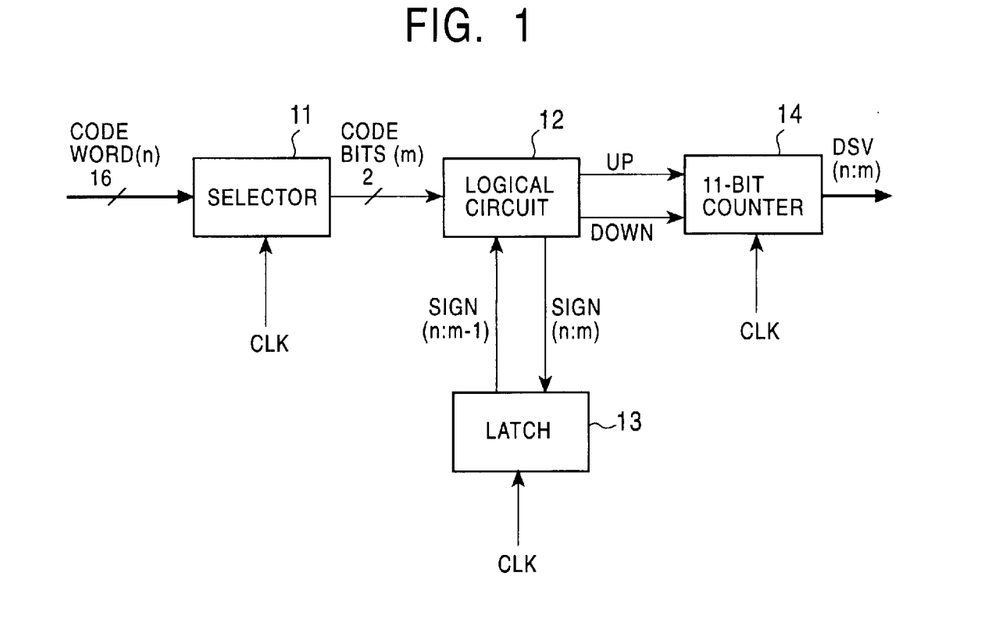
FIG. 1 is a block diagram showing a DSV calculation circuit according to a first embodiment of the present invention.

FIG. 1 shows a block diagram of a DSV calculation circuit as a dc balance calculation circuit for a recording signal generator according to a first embodiment of the present invention.

At first, a circuit, an apparatus and a system to which the DSV calculation circuit according to the first embodiment is applied will be described.

The DSV calculation circuit according to the first embodiment are ones used as the DSV calculation circuits 123 and 124 in the eight-to-sixteen modulation circuit shown in FIG. 7. The eight-to-sixteen modulation circuit shown in FIG. 7 is applied to the modulator 113 in the data converter 102 shown in FIG. 6. The data converter 102 shown in FIG. 6 is applied to the DVD master-disc production system shown in FIG. 5. The structures and operations of the system shown in FIG. 5, the unit shown in FIG. 6 and the circuit shown in FIG. 7 have been described. Accordingly, the description of them will be omitted here.

A 16-bit code word output from the eight-to-sixteen conversion table 121 or 122 is input to the DSV calculation circuit according to the first embodiment. The DSV calculation circuit according to the first embodiment includes a selector 11 as selection means for sequentially separating the input n-th Code Word(n) from its start into code bits(m) as 2-bit unit data in accordance with each clock "clk", and selectively outputting the code bits(m) (where m represents the order from the head). The condition of each bit in the code bits(m) when it is "1" means the inversion of an output waveform, and the condition of it when it is "0" means the non-inversion of the output waveform.

The DSV calculation circuit according to the first embodiment also includes a logic circuit 12 as determination means for carrying out an operation with the code bits(m) output from the selector 11, and "Sign(n:m−1)" representing whether the output waveform at the termination of the last code bit(m−1) is at high level or low level, whereby outputting a count-up signal "Up" for increasing by only a predetermined value a DSV as a dc balance value representing a shift in the dc balance of a recording signal, a count-down signal "Down" for reducing the DSV by a predetermined value, and the "Sign(n:m)" of the code bits (m), and a latch 13 operating in accordance with the clock clk for holding Sign(n:m) output from the logic circuit 12 and providing it to the logical circuit 12 when the subsequent code bits(m+1) are input.

The DSV calculation circuit according to the first embodiment further includes an 11-bit counter 14 as dc-balance-value calculation means for outputting the DSV(n:m) which is the DSV at the termination of the code bits(m) for the n-th code word by performing a count operation in accordance with the clock clk. The 11-bit counter 14 performs a count-up operation when the count-up signal Up output from the logical circuit 12 is "1", while performs a count-down operation when the count-down signal Down is "1", and performs an operation so as not to change the counted value when both the count-up signal Up and the count-down signal Down are "0". The logical circuit 12 is designed not to output both the count-up signal Up and the count-down signal Down of "1".

Referring to the operation of the DSV calculation circuit according to the first embodiment, the n-th Code Word(n) input is sequentially separated from its start in accordance with the clock clk by the selector 11 into code bits(m) as 2-bit unit data, and is selectively output to be input to the logical circuit 12.

At this point, the patterns of the code bits(m) and the DSV changes corresponding thereto will be mentioned. The eight-to-sixteen modulation must have the condition that, between consecutive inverted bits "1" and "1", there are inserted two or more non-inverted bits "0", in other words, there is a series of two or more non-inverted bits "0". Thus, the code bits(m) have only three patterns: "00"; "01" and "10". The changing patterns of the output waveform corresponding to the patterns of the code bits(m) are as follows:

When the code bits(m) have the pattern of "00", the output waveform has the changing pattern of high level, high level or low level, and low level. When the code bits(m) have the pattern of "01", the output waveform has the changing pattern of high level, low level and high level. When the code bits(m) have the pattern of "10", the output waveform has the changing pattern of high level, high level or low level, and low level. Accordingly, the DSV change by the code bits(m) has only three types of ±2 and 0. This is less than the number of the values (five values: ±2, ±1 and 0) of a DSV change per unit data of two bits on the assumption that there is no condition in which the code word has a series of two or more non-inverted bits "0". According to the first embodiment, the DSV change by the 2-bit code bits(m) can be represented by three types of information, which is used to enable a reduction in the circuit size and rapid calculation.

The logical circuit 12 outputs the count-up signal Up, the count-down signal Down, and Sign(n:m) by carrying out an operation with the code bits(m) output from the selector 11 and Sign(n:m−1).

Figure 2:
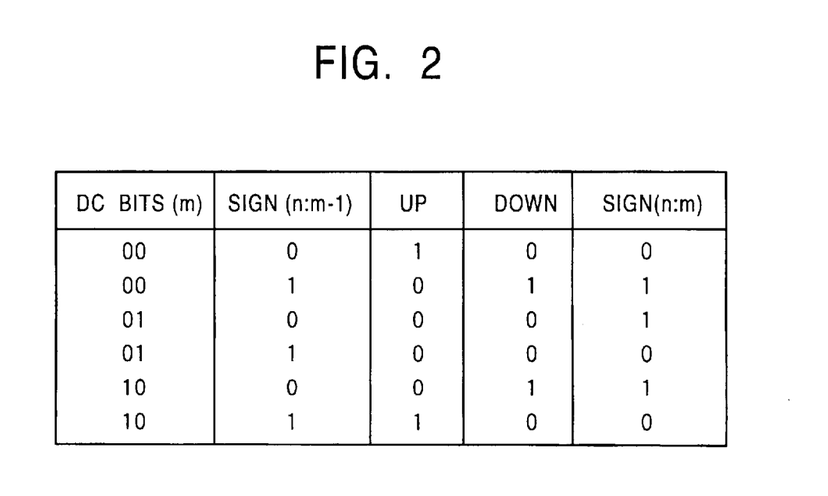
FIG. 2 is a table showing the contents of logical operation by a logical circuit shown in FIG. 1.

FIG. 2 shows the contents of logical operations performed by the logical circuit 12. Since the code bits(m) have the three patterns of "00", "01" and "10" as described above, and Sign(n:m−1) have the two patterns of "0" and "1", a combination of the code bits(m) and Sign(n:m−1) forms six patterns. However, the DSV change by the code bits(m) have only the three types of ±2 and 0. When the DSV change is +2, the logical circuit 12 sets the count-up signal Up to "1", while it sets the count-down signal Down to "0". When the DSV change is zero, the logical circuit 12 sets the count-up signal Up to "0", while it sets the count-down signal Down to "0". And, when the DSV change is +2, the logical circuit 12 sets the count-up signal Up to "0", while it sets the count-down signal Down to "1". Concerning Sign(n:m), "0" represents the count-up direction, and "1" represents the count-down direction. The logical circuit 12 sets Sign(n:m) to "0" when the output waveform is at high level at the termination of the code bits(m), and sets it to "1" when the output waveform is at low level.

Sign(n:m) output from the logical circuit 12 is held by the latch 13, and is supplied to the logical circuit 12 when the subsequent code bits(m+1) are input. The count-up signal Up and the count-down signal Down output from the logical circuit 12 are input to the 11-bit counter 14. The 11-bit counter 14 performs a count operation in accordance with the clock clk. The 11-bit counter 14 outputs the DSV(n:m) as the DSV for the code bits(m) from the n-th cord word by performing a count-up operation when the count-up signal Up output from the logical circuit 12 is "1", and performing a count-down operation when the count-down signal Down is "1". In the 11-bit counter 14, one count up means an increase in the DSV by 2, and one count down means a decrease in the DSV by 2.

According to the DSV calculation circuit in the first embodiment, the DSV is calculated in units of two bits per clock. Thus, DSV calculation for one code word can be performed in a time for eight clocks. The speed of the DSV calculation is the double that of the DSV calculation circuit shown in FIG. 11.

According to the DSV calculation circuit in the first embodiment, the DSV change has three values of ±2 and 0, and no odd value appears. Accordingly, the 11-bit counter 14 having one bit less, compared with the 12-bit counter 144 in the DSV calculation circuit shown in FIG. 11, sufficiently functions. This enables a smaller circuit size than that of the DSV calculation circuit shown in FIG. 11.

As a result, according to the DSV calculation circuit in the first embodiment, costs of a recording signal generator can be reduced, and the disc cutting speed can be increased.

Figure 3:
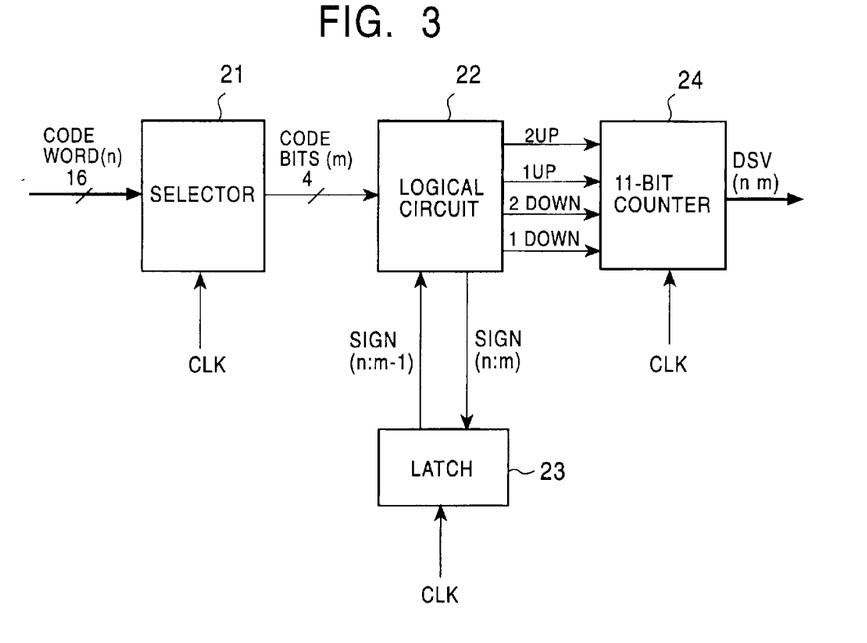
FIG. 3 is a block diagram showing a DSV calculation circuit according to a second embodiment of the present invention.

FIG. 3 shows a block diagram of a DSV calculation circuit according to a second embodiment of the present invention. The DSV calculation circuit according to the second embodiment includes: a selector 21 for sequentially separating the input n-th Code Word(n) from its start into 4-bit code bits(m) in accordance with each clock "clk"; a logical circuit 22 for outputting a two-count-up signal "2Up", a one-count-up signal "1Up", a two-count-down signal "2Down", a one-count-down signal "1Down", and Sign (n:m) by carrying out an operation with the code bits(m) output from the selector 21, and a sign(n:m−1) representing whether the output waveform at the termination of the last code bits(m−1) is at high level or low level; a latch 23 operating in accordance with the clock clk for holding Sign(n:m) output from the logical circuit 22 and supplying it to the logical circuit 22 when the subsequent code bits (m+1) are input; and an 11-bit counter 24 for performing a count operation in accordance with the clock clk, the signals 2Up, 1Up, 2Down and 1Down output from the logical circuit 22.

Referring to the operation of the DSV calculation circuit according to the second embodiment, the input n-th Code Word(n) is separated, sequentially from its start in accordance with the clock clk, into 4-bit code bits(m) by the selector 21, and the 4-bit code bits(m) are selectively output, which are input to the logical circuit 22.

Here the patterns of the code bits(m) and the DSV changes corresponding thereto will be mentioned.

As described above, the eight-to-sixteen modulation has the condition that a code word has a series of two or more non-inverted bits "0". Thus, the code bits(m) have only six patterns of "0000", "0001", "0010", "0100", "1000" and "1001". As a result, the DSV changes corresponding to the patterns of the code bits(m) have only five values of ±4, ±2 and 0. This is less than the number of the values (nine values: ±4, ±3, ±2, ±1 and 0) of a DSV change per unit data of four bits on the assumption that there is no condition in which the code word has a series of two or more non-inverted bits "0". Accordingly, according to the second embodiment, the DSV change by the code bits(m) of four bits can be expressed by five types of information. This enables a reduction in the circuit size and an increase in the calculation speed.

The logical circuit 22 outputs the two-count-up signal 2Up, the one-count-up signal 1Up, the two-count-down signal 2Down, the one-count-down signal 1Down, and Sign (n:m) by carrying out a logical operation with the code bits(m) output from the selector 21 and Sign(n:m−1).

Figure 4:
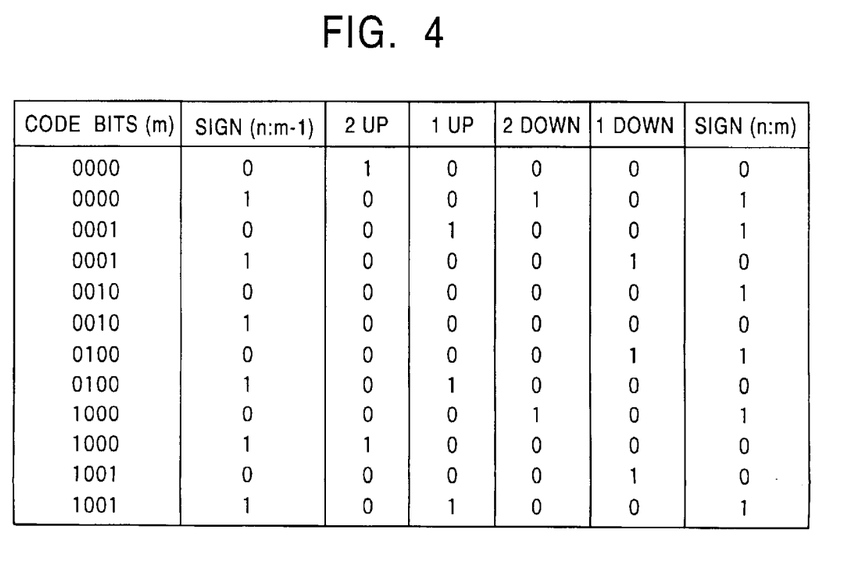
FIG. 4 is a table showing the contents of logical operation by a logical circuit shown in FIG. 3.

FIG. 4 shows the contents of logical operations performed by the logical circuit 22. Since the code bits(m) have the six patterns, and Sign(n:m−1) has the two patterns of "0" and "1", a combination of them forms twelve patterns. However, the DSV change by the code bits(m) has only five values of ±4, ±2 and 0. The signals 2Up, 1Up, 2Down and 1Down are set by the logical circuit 22 as follows:

When the DSV change is +4, the two-count-up signal 2Up is set to "1", and the other signals are set to "0". When the DSV change is +2, the one-count-up signal 1Up is set to "1", the other signals are set to "0". When the DSV change is −4, the two-count-down signal is set to "1", the other signals are set to "0". When the DSV change is −2, the one-count-down signal is set to "1", and the other signals are set to "0". And, when the DSV change is zero, all the signals are set to "0". The logical circuit 22 also sets Sign(n:m) to "0" when the output waveform is at high level at the termination of the code bits(m), and sets it to "1" when the output waveform is at low level.

Sign(n:m) output from the logical circuit 22 is held by the latch 23, and is supplied to the logical circuit 22 when the subsequent code bits(m+1) are input. The signals 2Up, 1Up, 2Down and 1Down output from the logical circuit 22 are input to the 11-bit counter 24. The 11-bit counter 24 performs a count-up operation in accordance with the clock clk as follows:

When the two-count-up signal 2Up is "1", the 11-bit counter 24 counts up by two. When the one-count-up signal 1Up is "1", it counts up by one. When the two-count-down signal 2Down is "1", it counts down by two. When the one-count-down signal 1Down is "1", it counts down by one. And, when all the signals are "0", it operates so as not to change the counted value, and outputs the DSV (n:m) as the DSV for the code bits(m) from the n-th code word. The two-count-up by the 11-bit counter 24 means an increase in the DSV by 4, and the one-count-up means an increase in the DSV by 2. The two-count-down means a decrease in the DSV by 4, and the one-count-down means a decrease in the DSV by 2.

According to the DSV calculation circuit in the second embodiment, a DSV calculation process is performed in units of four bits per clock, which enables calculation of a DSV for one code word in a time for four clocks. Accordingly, the DSV calculation process can be performed four times faster than that by the DSV calculation circuit shown in FIG. 11.

In addition, according to the DSV calculation circuit in the second embodiment, the DSV change has five values of ±4, ±2, 0, and no odd values. Accordingly, the 11-bit counter 24 having one bit less than the 12-bit counter 144 in the DSV calculation circuit shown in FIG. 11 functions sufficiently, which enables a circuit size smaller than the DSV calculation circuit shown in FIG. 11. The DSV calculation circuit in the second embodiment requires the 11-bit counter 24 to count by ±2 at one time differently from an ordinary up/down counter. Nevertheless, compared with an adder, the circuit size of the 11-bit counter 24 is smaller, which is on a practical level. In addition, it is possible to increase the speed of the calculation by separating the code word into a plurality of unit data of at least four bits. However, it is noted that the structure of a required counter be complicated to enlarge its circuit size.

Other structures, operations and advantages of the second embodiment are similar to those of the first embodiment.

The present invention is not limited to the foregoing embodiments. For example, the embodiments have described a case where the present invention is applied to a recording signal generator for using eight-to-sixteen modulation to generate a recording signal to be recorded on a DVD. However, the present invention is not limited to the case but can be, in general, applied to recording signal generators for performing the block coding of original data to generate a code word having a series of two or more non-inverted bits, and generating a recording signal based on the code word. For example, the present invention can be applied to recording signal generators employing a modulation method called eight-to-fourteen modulation for compact discs.

What is claimed is:

1. A dc balance-value calculation circuit, used in a recording signal generator for performing the block coding of original data to generate a code word having a series of at least two non-inverted bits and generating a recording signal based on said code word, provided for calculating a dc balance value representing a shift in the dc balance of said recording signal, in which said dc balance-value calculation circuit includes:
    selection means for separating said code word generated by the block coding into unit data of a plurality of bits, and selectively outputting said unit data;
    determination means for determining a change in a dc balance value for each unit data, based on said unit data output by said selection means;
    and dc-balance-value calculation means for calculating a dc balance value in accordance with the determination result by said determination means, wherein said determination means includes a logical circuit for outputting a signal representing the change in the dc balance value by carrying out a logical operation based on said unit data output by said selection means and the condition of said recording signal at the termination of previous unit data, wherein said dc-balance-value calculation means includes an 11-bit counter for performing a count operation in accordance with the signal output by said logical circuit.

2. A recording signal generator including:

block coding means for performing the block coding of original data to generate a code word having a series of at least two non-inverted bits;

dc-balance-value calculation circuit for calculating a dc balance value representing a shift in the dc balance of the block-coded data;

and generating means for generating a recording signal based on said block-coded data, in which said dc-balance-value calculation circuit includes: selection means for separating said code word obtained by said block coding means into a plurality of unit data composed of a plurality of bits and selectively outputting the unit data; determination means for determining a change in a dc balance value for each unit data, based on said unit data output by said selection means; and dc-balance-value calculation means for calculating a dc balance value in accordance with the determination result by said determination means, wherein said determination means includes a logical circuit for outputting a signal representing the change in the dc balance value by carrying out a logical operation based on said unit data output by said selection means and the condition of said recording signal at the termination of previous unit data, wherein said dc-balance-value calculation means includes an 11-bit counter for performing a count operation in accordance with the signal output by said logical circuit.

* * * * *